Sept. 1, 1942.  C. W. YELM  2,294,821
V-TYPE BELT
Filed April 4, 1941

INVENTOR.
CHARLES WALTER YELM
BY Martin E. Anderson,
ATTORNEY

Patented Sept. 1, 1942

2,294,821

UNITED STATES PATENT OFFICE 2,294,821

V-TYPE BELT

Charles Walter Yelm, Denver, Colo., assignor to The Gates Rubber Company, Denver, Colo., a corporation of Colorado Application April 4, 1941, Serial No. 386,810

2 Claims. (Cl. 74—234)

This invention relates to improvements in flexible belts of the V-type and more particularly to V-type side driving belts of greater width than thickness.

In various types of power transmission it is desirable to employ a grooved pulley in combination with a flat surfaced pulley and for such types of belt drives a belt is required which will function equally well with both types of pulleys. Such belts are usually of greater width than thickness and are preferably outwardly transversely convex so as to more effectively resist the action of forces tending to bend the belt inwardly when passing over a grooved pulley and to increase the pressure against the driving sides of the grooves in the grooved pulleys.

For convenience in manufacturing and for the purpose of saving material such belts are provided on their inner surfaces with a longitudinally extending depression whose surface never contacts the outer surface of a flat pulley. Since the flat pulleys do not engage the edges of the belt as a grooved pulley does it does not oppose the tendency of the belt to spread laterally and the tension in the belt therefore tends to bend the belt inwardly thereby shifting the forces from the center towards the edges and as a result the strains along the sides or edges of the belt become excessive thereby shortening the life of the belt.

It is an object of this invention to produce a belt of the type referred to above which will not materially alter its transverse shape in passing over a flat surfaced pulley and which will therefore limit the shifting of the tension strains towards the edges.

Another object is to produce a belt of the above type which maintains a constant area per unit length in contact with the surface of a flat pulley regardless of the belt tension.

The above and any other objects that may become apparent as this description proceeds are obtained by means of a construction that will now be described in detail and for this purpose reference will be had to the accompanying drawing in which the invention has been illustrated, and in which.

Figure 1:
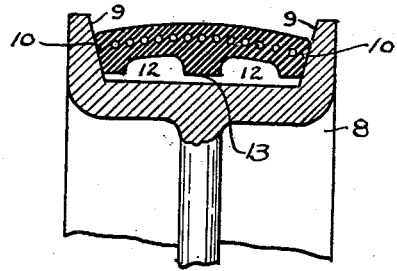
Figure 1 is a transverse section of a belt embodying the present invention showing the same in position in a grooved pulley.

It has been pointed out above that V-type side driving belts, especially those that have greater width than thickness, have a tendency to bend inwardly and decrease the tension of the cords from the edges of the belt towards the middle when the belt is operating to transmit power.

Since belts of this type are provided with one or more layers of cord that extend longitudinally and which constitute a tension resisting core, it is important that the belt be so constructed that the tensional strain is distributed as equally as possible among the cords of the core and for this purpose the belt should be so constructed that the inward bending is reduced to a minimum during operation.

In the present invention the belt is formed from an inner layer or cushion 5 of comparative soft rubber on which is supported a layer 6 of cords which occupies a position adjacent the neutral axis of the belt, on the upper or outer surface of the cord layer is another layer of rubber composition which has been designated by reference numeral 7 and which may be so compounded that it is harder than the inner layer. If desired, the outer layer may be corrugated transversely of the belt as suggested in the prior art.

Referring now more particularly to Figure 1 where the belt has been shown as positioned in a grooved pulley 8 and in which the inclined sides of the groove have been designated by reference numeral 9, it will be seen that the belt does not bottom in the groove and that it has inclined sides 10 which engage the sides 9 of the pulley to provide the necessary frictional contact.

Figure 2:
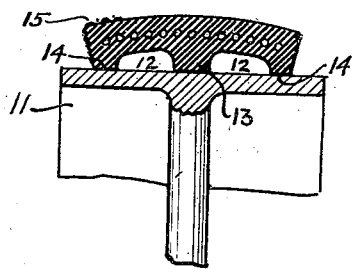
Figure 2 is a transverse section showing the belt in position on a flat surfaced pulley.

It will be observed that the belt is outwardly transversely convex, the purpose of this construction being to produce an arch that resists forces tending to bend the belt inwardly during operation. Due to the resilient and yielding nature of the material employed, there will always be some inward transverse flexure of such a belt during operation, but due to the resistance offered by the sides 9, the inward flexure will be less than if the belt was transversely straight. In Figure 2, the belt has been shown in engagement with the outer surface of a flat surfaced pulley 11. It is frequently necessary in belt transmissions to employ a grooved pulley in combination with a flat surfaced pulley. Due to the fact that the flat surfaced pulleys have no side walls corresponding to the walls 9 of the groove in pulley 8, the belt can be more readily flexed inwardly during operation as the arched effect is partly destroyed due to the absence of abutments.

If the inner surface of a belt is made straight, it will not flex inwardly when in driving contact with a flat surface pulley. For reasons which will hereinafter appear, it is necessary to depress the inner surface of the belt leaving two ribs 14 along each side for engaging the pulley surface. A belt so made will flex inwardly due to the tension to which it is subjected and this reduces the tension in the cords near the middle of the belt and subjects the cords near the edges to an excessive tension. To prevent the transfer of tension from the center cords to the cords near the edges of the belt, it is necessary to provide one or more supporting ribs 13 that limit the inward flexing of the belt when passing over a flat surfaced pulley. When the belt is free from tension, the inner surfaces of ribs 13 and 14 are in a straight line. The belt may therefore be defined as having a transversely straight inner driving surface provided with spaced grooves or as having a concave or depressed inner surface provided with spaced parallel ribs.

The presence of the grooves 12 is due to the fact that when the belt is manufactured the material is arranged in transversely flat layers and is given its arched shape during the curing operation in the mold. Another reason for the grooves 12 is that a considerable amount of material is thus saved over what would be required if such grooves were absent. Since the flat pulleys are nearly always of much larger diameter than the grooved pulleys with which they cooperate, the surface area in contact is sufficient for the purpose of transmitting the power even with the two grooves 12. In the embodiment shown in Figure 2, the parts of the belt that contact with the pulley have been designated by reference numerals 13 and 14. It is apparent that the rib 13 is very effective for resisting inward bending of the belt while passing around the flat surfaced pulley and therefore the decrease in tension of the cords nearer the middle of the belt is greatly limited over what it would be if the center rib 13 were absent.

Figure 4:
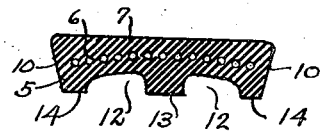
Figure 4 is a cross section of a belt showing another slightly modified form of construction.

Since the surfaces 13 and 14 act as friction surfaces only while in contact with the large flat surfaced pulley, they may be quite narrow and in the embodiment shown in Figures 1, 2 and 4 the combined widths of grooves 12 is greater than half the width of the belt leaving the combined width of the friction surfaces 13 and 14 less than half the width of the belt. This relationship may prevail regardless of the number of grooves. The greater the total widths of groove 12 are, the more effectively the transverse arching of the cord layer can be effected.

Attention is called at this point to the fact that the belt may be provided with the usual covering of bias cut rubberized fabric which has been indicated at 15 in Figure 2.

Figure 3:
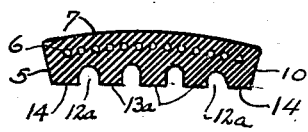
Figure 3 is a cross section of a belt showing a slightly modified form of construction.

In Figures 1 and 2, the belt has been shown as having two longitudinally extending grooves 12 spaced by the rib 13 and in Figure 3 a slight modification has been shown in which the inner surface is provided with four narrow grooves 12a separated by ribs 13a. The depth of the grooves 12 decrease from the center towards the side so as to effect the outward arching of the cord layer 6.

In Figure 4, a belt has been shown whose cross section differs from that shown in Figures 1 and 2, in this, that the outer surface is transversely straight instead of convex. The reason for the cross sectional shape shown in Figure 4 is to produce a belt that can transmit power from both its inner and outer surface and also along its inclined edges 10. It sometimes happens that a belt power transmission requires two flat pulleys in combination with one grooved pulley and in such cases one of the flat pulleys contact the outer surface of the belt while the other flat pulley is in contact with the inner surface.

Particular attention is called to the fact that in its normal shape the inner surface of the belt is transversely straight, regardless of whether the outer surface is convex as shown in Figures 1, 2 and 3 or straight as shown in Figure 4. It is apparent that a belt of the construction here shown and described has a constant area of contact per unit length with the outer surface of a flat pulley and that this does not change due to changes in belt tension.

From the above description when taken in connection with the drawing, it will be seen that the belt that forms the subject of this invention is so constructed that the changes in the tension of the cords will be restricted to a minimum during operation due to the fact that there can be no inward transverse flexure of the belt while passing over the flat surfaced pulley and any flexure that takes place will therefore be limited to the comparatively small flexing while passing over the grooved pulley.

Although this invention has been shown and described in connection with belts of greater width than thickness, it is to be understood that this is not an essential limitation for the reason that V-type side driving belts are frequently quite thick and may therefore have sufficient width to flex to an objectionable extent even if they have less width than thickness.

Having described the invention what is claimed as new is:

1. A combined edge and inside driving belt for use with V-grooved and flat surfaced pulleys, said belt having at least one transversely extending outwardly convex layer of tension resisting cords embedded therein and extending lengthwise thereof, the inner surface of the belt having a friction surface along each edge, the surface between the two friction surfaces being depressed, the depressed surface having at least one inwardly extending rib adapted to engage the outside of a flat surfaced pulley to resist forces tending to flex the belt inwardly toward the surface of the pulley and thereby limit the decrease in tension of the cords nearest the middle of the layer, the friction surfaces and the corresponding surface of the rib being normally in a straight line transverse of the belt.

2. An endless belt of the side driving V-type having a body of yieldable rubber composition, a transversely extending outwardly convex layer of longitudinal tension cords positioned in the body of the belt adjacent its neutral axis, the inner surface of the belt being transversely straight and provided with at least two spaced longitudinally extending grooves, the total width of the grooves being greater than one-half the width of the belt.

CHARLES WALTER YELM.